Feb. 15, 1927.

H. LOWRY

SINKER

Filed Sept. 7, 1923

1,618,100

Howard Lowry
INVENTOR

BY Victor J. Evans
ATTORNEY

M. J. Trainor
WITNESS.

Patented Feb. 15, 1927.

1,618,100

UNITED STATES PATENT OFFICE.

HOWARD LOWRY, OF UPPER SANDUSKY, OHIO.

SINKER.

Application filed September 7, 1923. Serial No. 661,469.

This invention has reference to improvements in sinkers or weights for fishing lines, and has for its object to provide a sinker whereby the fishing line may be easily, quickly and securely attached thereto without necessitating the cutting or the knotting of the line, and also wherein the sinker will be supported in a longitudinal plane with the line.

A further object is to produce a weight or sinker for fishing lines that is grooved longitudinally its entire length to provide a passage for the fishing line and which is notched transversely at the opposite sides of the groove to receive therethrough loops which are formed in the line, and whereby the sinker may be easily, quickly and securely attached to the line.

The drawing which accompanies and which forms part of this application illustrates a satisfactory embodiment of the improvement reduced to practice, and wherein:—

Figure 1:
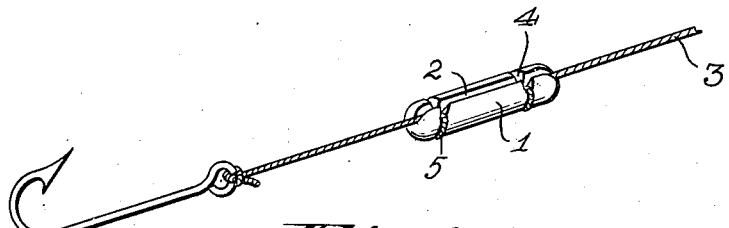
Figure 1 is a perspective view of the sinker or weight showing the method of attaching the same to the cord or fishing line.
Figure 2:
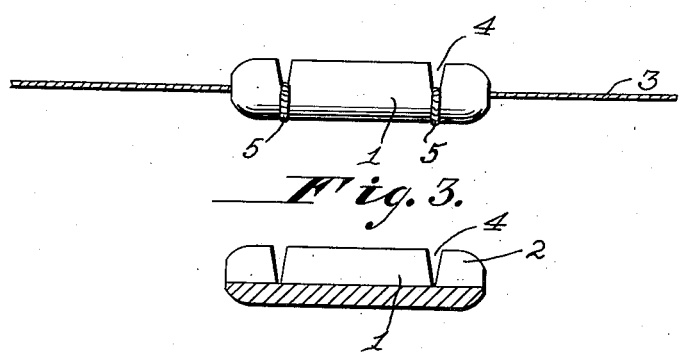
Figure 2 is a side elevation thereof.
Figure 3:
Figure 3 is a longitudinal sectional view taken in a line with the groove in the sinker.
Figure 4:
Figure 4 is a transverse sectional view taken in a line with one of the notches in the sinker.
Figure 5:
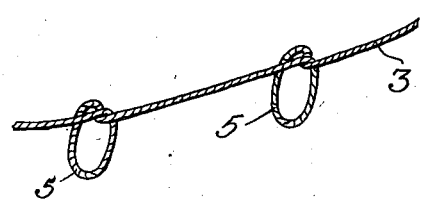
Figure 5 is a perspective view of the fishing line showing the loops made therein to engage the sinker.

My improved sinker may be constructed of any desired material which is not susceptible to disintegration from water either salt or fresh. My sinkers may be cheaply manufactured and marketed, as a great number of the said sinkers may be cut from a single bar or body. The sinker comprises a member 1 which is round in cross section. The member 1 is grooved longitudinally, as at 2. The groove extends the entire length of the member. The groove is of a depth slightly greater than one-half the thickness of the sinker so that the fishing line received in the said groove and secured to the sinker in a manner which will presently be described, will be disposed approximately centrally with respect to the axial plane of the sinker, and whereby the line will be thus held straight and taut when the sinker is raised above the bottom of the fishing stream.

The member 1, adjacent to its ends is notched transversely, as at 4 respectively. The notches pass through the groove. The depth of the notches corresponds to that of the groove.

In attaching the sinker to a line, the line 3 is looped loosely through one of the notches 4 to provide a loop 5, and the line proper is passed through the loop. The line is then formed with a second loop 5 around the second notch 4, the said line being passed through the loop and thus the line is attached to the sinker.

It is believed that the foregoing description, when taken in connection with the drawing, will fully set forth the construction and advantages of a sinker constructed in accordance with this invention.

Both the groove 2 and the notches 4 have their opposed walls inwardly inclined so that the line 3 and its loops 5 will be wedgingly received in the said groove and notches.

Having described the invention, I claim:—

A sinker for fishing lines comprising a member which is round in cross section and which is formed with a substantially V-shaped groove that extends through the entire length thereof and which is of a depth slightly greater than one-half of the thickness of the sinker and which has notches adjacent to its ends of a depth corresponding to the depth of the groove, and said groove designed to receive therein and have wedgingly engaging with the walls thereof a fishing line that is looped upon itself at spaced intervals whereby the said loops will be received through the notches and embrace the portions of the sinker opposite said notches and also whereby the fishing line will be disposed approximately centrally with respect to the axial plane of the sinker.

In testimony whereof I affix my signature.

HOWARD LOWRY.